United States Patent [19]

Lee et al.

[11] Patent Number: 5,363,701
[45] Date of Patent: Nov. 15, 1994

[54] MATERIAL CHARACTERIZING SYSTEM

[75] Inventors: Gilbert F. Lee, Greenbelt; Bruce Hartmann, Silver Spring, both of Md.

[73] Assignee: The United States of America as represented by the Secretary of the Navy, Washington, D.C.

[21] Appl. No.: 227,771

[22] Filed: Apr. 14, 1994

Related U.S. Application Data

[63] Continuation of Ser. No. 652,821, Feb. 8, 1991.

[51] Int. Cl.$^5$ .................................... G01H 15/00
[52] U.S. Cl. ........................................ 73/574; 73/575
[58] Field of Search .................. 73/574, 575, 579, 602

[56] References Cited

U.S. PATENT DOCUMENTS

| 4,297,884 | 11/1981 | Leueque et al. | 73/579 |
| 4,352,292 | 10/1982 | Madigosky et al. | 73/575 |
| 4,418,573 | 12/1983 | Madigosky et al. | 73/575 |

Primary Examiner—Hezron E. Williams
Assistant Examiner—Rose M. Finley
Attorney, Agent, or Firm—Jacob Shuster

[57] ABSTRACT

A plurality of elongated test specimens undergo vibrations induced by random noise within an acoustical frequency range establishing standing waves therein having resonant frequencies at which the collection of measurement data through accelerometers mounted at the ends of the specimens provides for calculation of physical material properties. The processing of the data during collection, analysis and calculation is automated by programmed computer control.

12 Claims, 6 Drawing Sheets

MATERIAL CHARACTERIZING SYSTEM

This application is a continuation of pending application No. 07/652,821, filed Feb. 8, 1991.

BACKGROUND OF THE INVENTION

This invention relates generally to the determination of material physical properties such as Young's modulus, and more particularly involves certain improvements to apparatus and methods covered in U.S. Pat. No. 4,418,573 to Madigosky et al., the disclosure of which is incorporated herein by reference.

Several disadvantages or problems have arisen in the use of the apparatus disclosed in the Madigosky et al. patent, involving the requirement for constant and prolonged services of an experienced operator familiar with specialized equipment, such as the fast Fourier transform spectrum analyzer, to make measurements and manually perform data analysis and calculations. Such requirement of the apparatus leads, of course, to operator dependent errors.

It is therefore an important object of the present invention to upgrade electronic collection of data in systems for determining physical properties of test specimens of material derived from measurements of acoustically induced vibrations imparted to such specimens and automating analysis of the collected measurement data.

An additional object of the invention in accordance with the foregoing object is to provide for easier and more rapid data processing, with less likelihood of resultant calculation errors from input of measurements derived from elongated bar-shaped specimens undergoing mechanical resonance vibrations in the kHz region over a wide temperature range.

SUMMARY OF THE INVENTION

In accordance with the present invention, measurement data is collected in sequence from pairs of accelerometers mounted on the opposite ends of a plurality of test specimens of materials undergoing acoustically induced standing wave vibrations within a common temperature controlled environment. The collected data undergoes automated analysis, including deletion of error producing components, extraction of data corresponding to resonant peak frequencies of the standing wave vibration and time-temperature superposition shift to obtain calculations of the material properties. The automated data processing involved is effected by a computer programmed to control data collection from the plurality of specimens and the Fourier transform spectrum analyzer aforementioned.

According to another aspect of the invention, the accelerometers are mounted on the ends of the test specimens by steel blocks to which they are bonded in order to protect the electrical leads carrying the measurement data signals from abuse heretofore caused by repeated mounting and dismounting of the accelerometers.

BRIEF DESCRIPTION OF THE DRAWING FIGURES

Other objects advantages and novel features of the invention will become apparent from the following detailed description of the invention when considered in conjunction with the accompanying drawing wherein.

DETAILED DESCRIPTION OF THE PREFERRED EMBODIMENT

Figure 1:
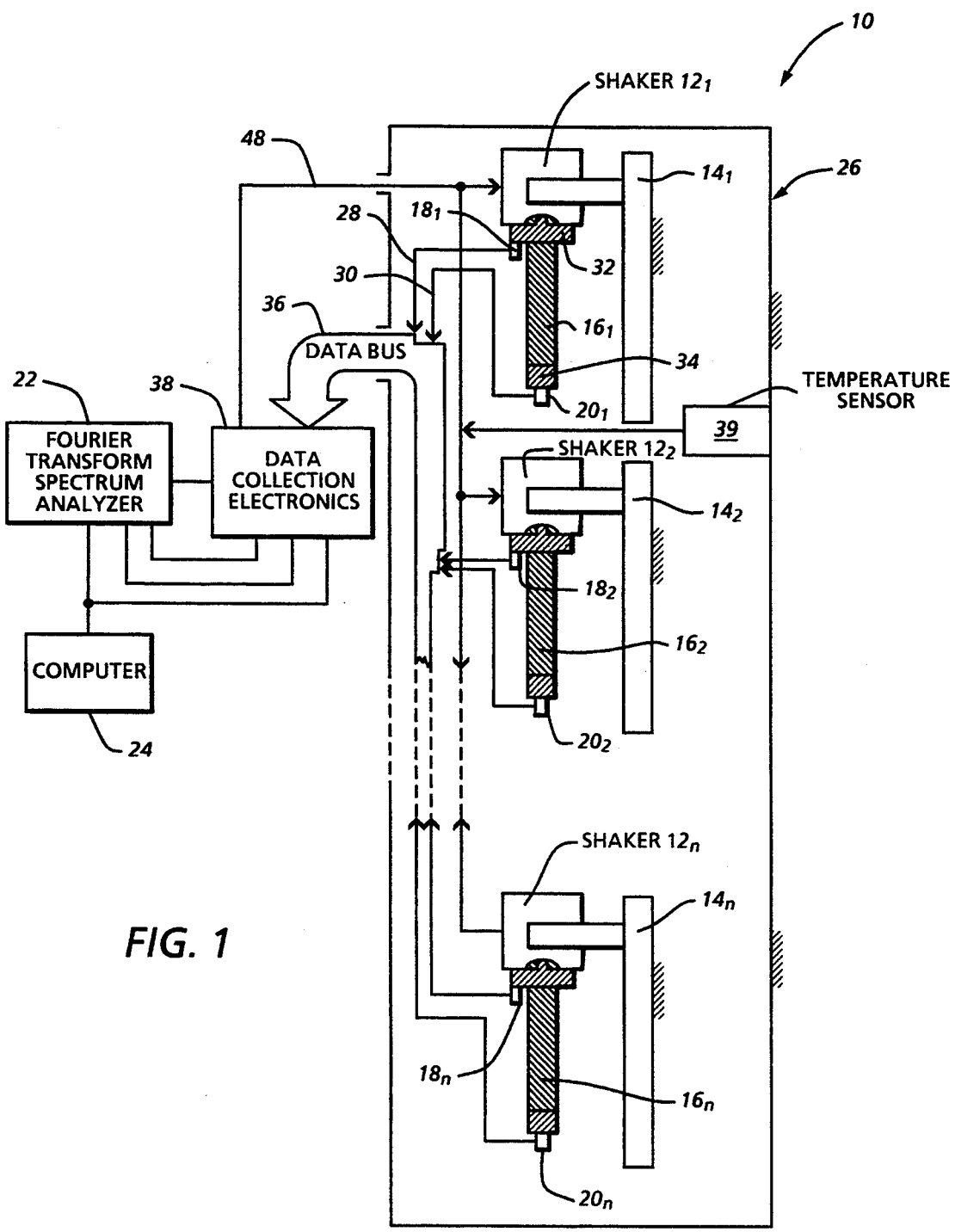
FIG. 1 is a schematic illustration of apparatus for performing the method of the present invention.

Referring now to the drawing in detail, FIG. 1 illustrates test apparatus generally referred to by reference numeral 10 in accordance with one embodiment of the invention. Associated with apparatus 10, in an arrangement similar to that disclosed in the aforementioned patent to Madigosky et al., are electromagnetic shakers $12_1$ $12_2$ ... $12_n$, fixedly secured to and supported by separate standing support structures $14_1$, $14_2$ ... $14_n$ within a common temperature controlled enclosure 26. The separate supports 14 for the specimens 16 avoid interference or cross talk between the measurement operations respectively associated with the specimens. The shakers acoustically drive elongated test specimens $16_1$, $16_2$ ... $16_n$, respectively, at one of their ends to introduce random noise while the other ends are allowed to move freely during such measurement operations. Accelerometers $18_1$ $18_2$ ... $18_n$ and $20_1$, $20_2$ ... $20_n$ are mounted on opposite ends of the test specimens 16 to sequentially produce output signals as measurement data to be processed by a fast Fourier transform spectrum analyzer 22 within a predetermined frequency range under programmed control of a computer 24 as described in the Madigosky et al. patent.

In accordance with one aspect of the present invention, electrical leads 28 and 30 carrying the output signals from the aforementioned accelerometers are protected from repeated mounting and dismounting abuse by bonding of the accelerometers to steel blocks secured to the ends of-the specimen, such as the blocks 32 and 34 as shown in FIG. 1. Thus, each accelerometer 18 directly bonded by mounting block 32 to the drive end of a specimen 16, is thereby secured to a shaker 12 while an accelerometer 20 is bonded to mounting block 34 at the free end of the test specimen.

With further reference to FIG. 1, the enclosure 26 accommodates the testing of a plurality of test specimens through associated shakers 12 supported on the support standing structures 14. A pair of end mounted accelerometers 18 and 20 are respectively associated with each of the test specimens through mounting blocks 32 and 34 as hereinbefore described. Each pair of accelerometers will accordingly have output leads 28 and 30 extending therefrom to supply measurement data signals to a data bus 36. Measurement output data is thereby simultaneously fed from the pairs of accelerometers 18 and 20 on a specimen 16 undergoing a measurement operation under programmed control of data collection electronics 38 to which the analyzer 22 and computer 24 are operatively connected in accordance with the present invention as diagrammed in FIG. 1.

The temperature within enclosure 26 is also monitored by a sensor 39 from which temperature signals are conducted to the data collection electronics 38 through data bus 36 as a program controlling input hereinafter referred to.

Figure 2:
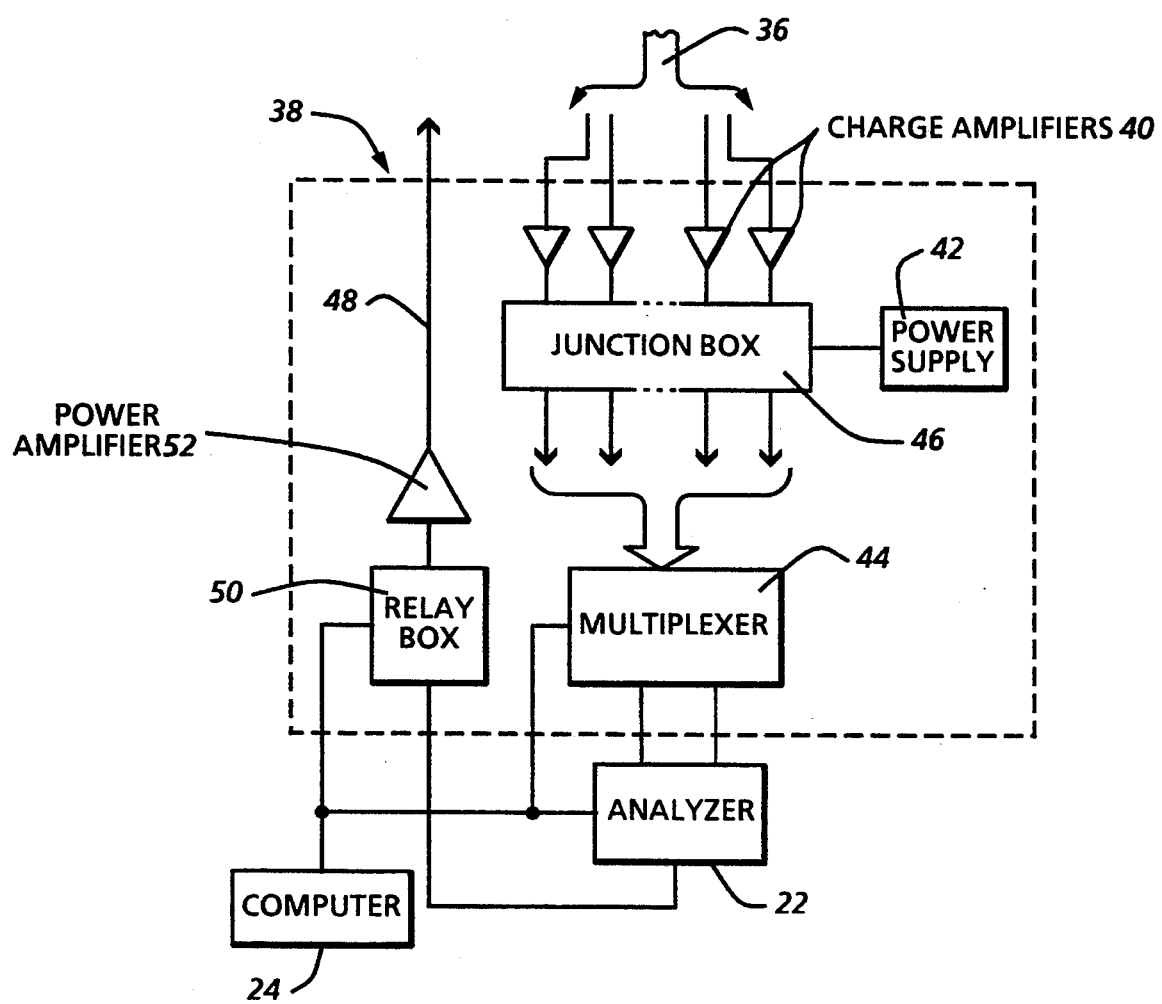
FIG. 2 is circuit block diagram illustrating the data collection electronics denoted in FIG. 1, with greater detail.

Referring now to FIG. 2, the data collection electronics 38 is diagrammed in greater detail and includes pairs of charge amplifiers 40 to which measurement data signals from the respective pairs of accelerometers 18 and 20 are fed by data bus 36 to provide measurement data on mechanical vibrations imparted by the shakers 12 to the drive ends of the test specimens 16 and output responses from the free ends of the specimens. The pairs of charge amplifiers 40 are electronically connected to a power supply 42 and a multiplexer 44 through a junction box 46 in order to route each pair of measurement signals from a pair of accelerometers on each of the test specimens to the analyzer 22 from which the noise driving signal in line 48 for the shakers is derived. By means of a relay box 50 connected to the analyzer 22, operation of the shakers through line 48 by turn-on and turn-off of the driver signal source in the analyzer limits the periods during which measurements are being made by the accelerometers so as to avoid transfer of heat to the specimens by heat build up in the shakers while temperatures are being changed between measurements. When the drive signal source is switched on by the relay box 50, the noise output from the analyzer 22 is amplified by power amplifier 52 to form the drive signal fed through line 48 to the shakers.

Figure 3:
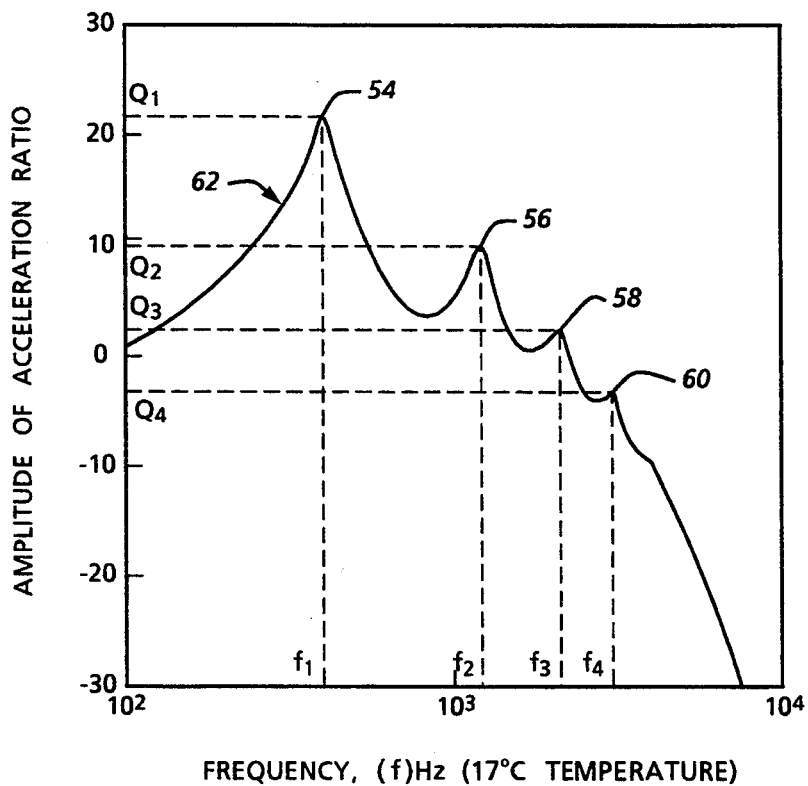
FIGS. 3 and 4 are graphical representations of raw data obtained from the specimens undergoing testing in the arrangement depicted in FIG. 1.
Figure 4:
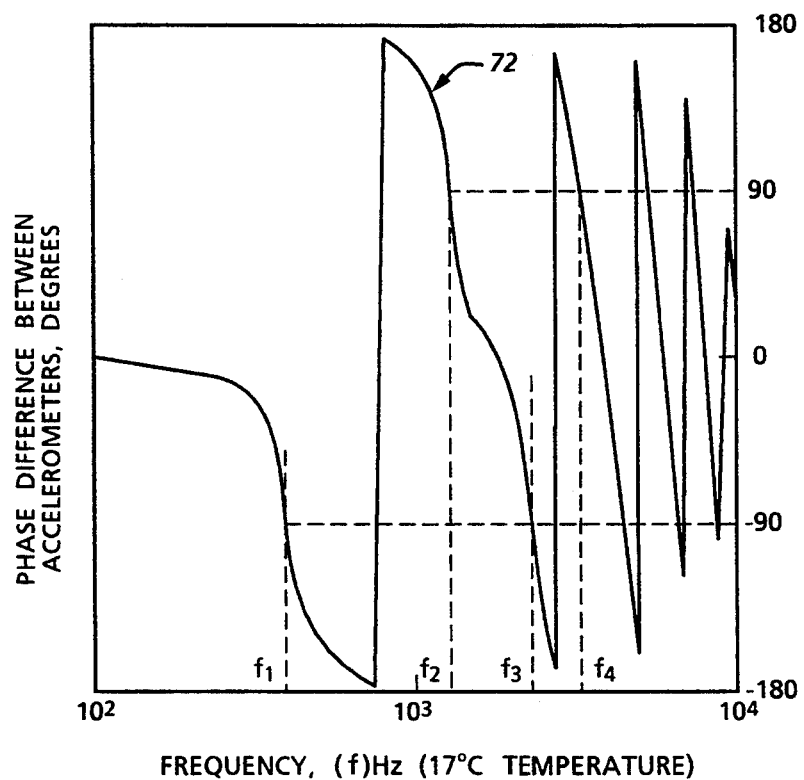
Figure 5:
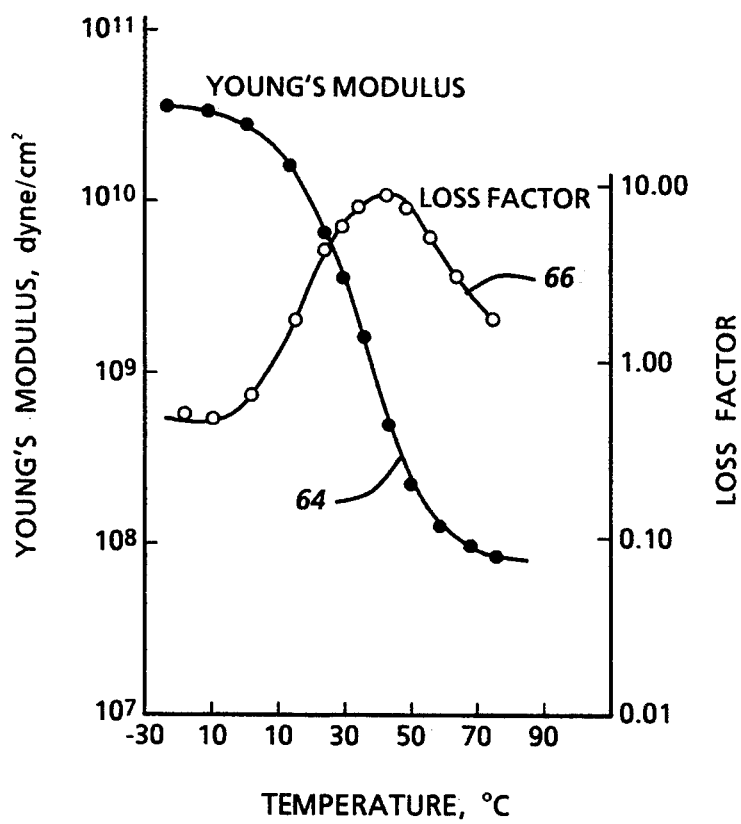
FIGS. 5 and 6 are graphical representations of data calculated from the raw data represented in FIGS. 3 and 4.
Figure 6:
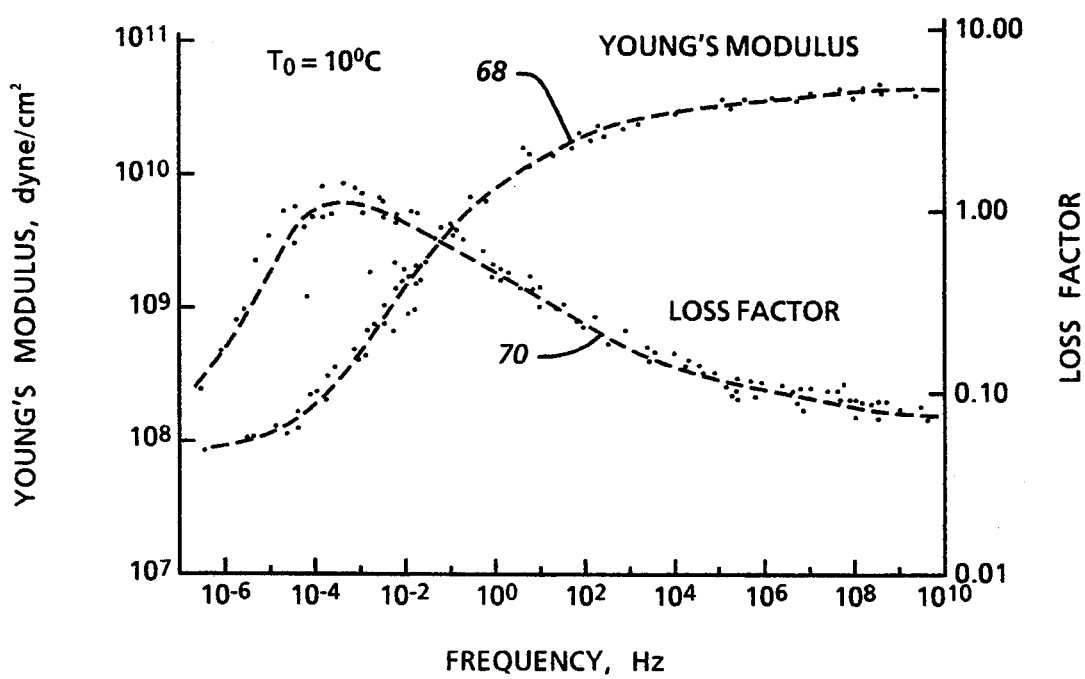

As indicated in the Madigosky et al. patent, the provision of a random noise source in the analyzer 22 to drive shakers 12 is accompanied by the performance of various other functions in the analyzer 22, including the analysis of the measurement signals in lines 28 and 30 to display or readout processed data as functions of the ratio of acceleration amplitudes and phase difference between signal frequencies at the driven and free ends of a test specimen from which material properties of the test specimen are calculated. Such data processing and calculation operations of the analyzer 22, must however involve selection of the raw measurement data collected at resonant frequency peaks 54, 56, 58 and 60 of the vibrations imparted to the specimens by the shakers over a range within which standing waves are established between the specimens ends as shown on curve 62 in FIG. 3 plotting the acceleration amplitude ratio vs. frequency and the raw data plotted as curve 72 of FIG. 4 as phase difference between accelerometer measurements vs. frequency. The computer 24 is programmed to automatically control operation of the analyzer 22 and the data collection electronics 38 in accordance with the foregoing limitations as well as to accommodate such processing of data derived from the plurality of test specimens and automatic calculation of the material properties associated with the respective specimens, pursuant to the present invention. The material properties so calculated include Young's modulus and loss factor as denoted by curves 64 and 66 in FIG. 5 plotted against temperature, or curves 68 and 70 in FIG. 6 plotted against frequency under a constant temperature of 10° C. for example based on the raw input measurement data processed with a mechanical shift in accordance with the time-temperature superposition principle as referred to in the Madigosky et al. patent. The magnitude of the mechanical shift is characterized as a shift factor. Fitting shift factor vs. temperature to a WLF equation provides constants C1 and C2 in order to plot Young's modulus and loss factor over a wide frequency range at reference temperatures ($T_o$) other than the constant temperature under which curves 68 and 70 were plotted as shown in FIG. 6.

The computer 24 is programmed in accordance with the present invention to effect various functions through the analyzer 22 and data collection electronics 38. As outlined in the flow chart diagram of FIG. 7, a data collection program is initiated by creation of a data file for storing data on storage media as denoted by diagram block 74. The measurement start temperature of the controlled environment for the test specimens in enclosure 26, usually −60° C. is then established as denoted by block 76 before measurement operations are begun after elapse of start time, usually 12 hours. Such start time delay is inputted, as denoted by block 78. During such prolonged start time delay period, the test specimens are allowed to acquire a uniform temperature throughout at the temperature start level. The measurement operations are then initiated as hereinbefore described and the measurement data so obtained is processed as indicated by block 80 to locate the resonant frequency and associated amplitude ratio from the aforementioned curves 62 and 72 displayed at the same time in analyzer 22 as disclosed in the Madigosky et al. patent. Based thereon, Young's modulus is determined for each of the test specimens, as denoted by block 82, and such calculations are stored on the storage media as indicated by block 84 upon termination of the measurement operations, pursuant to step 80, to program turn-on and turn-off the shakers. If the temperature of a specimen is below 70° C. upon termination of the measurement operational phase, as denoted in program decision block 86, the temperature level is increased by 5° C. as denoted in block 88 to initiate a 20 minute interval, as indicated by a block 90, between measurement operations to allow uniform temperature distribution in the specimens. If the temperature level sensed was greater than 70° C., then the temperature level is lowered to 22° C. as denoted in block 92 and the calculated data separated into separate sets corresponding to the plurality of test specimens being tested as denoted in block 94. The computer 24 is then programmed to display termination of the measurement process as denoted by block 96.

Figure 7:
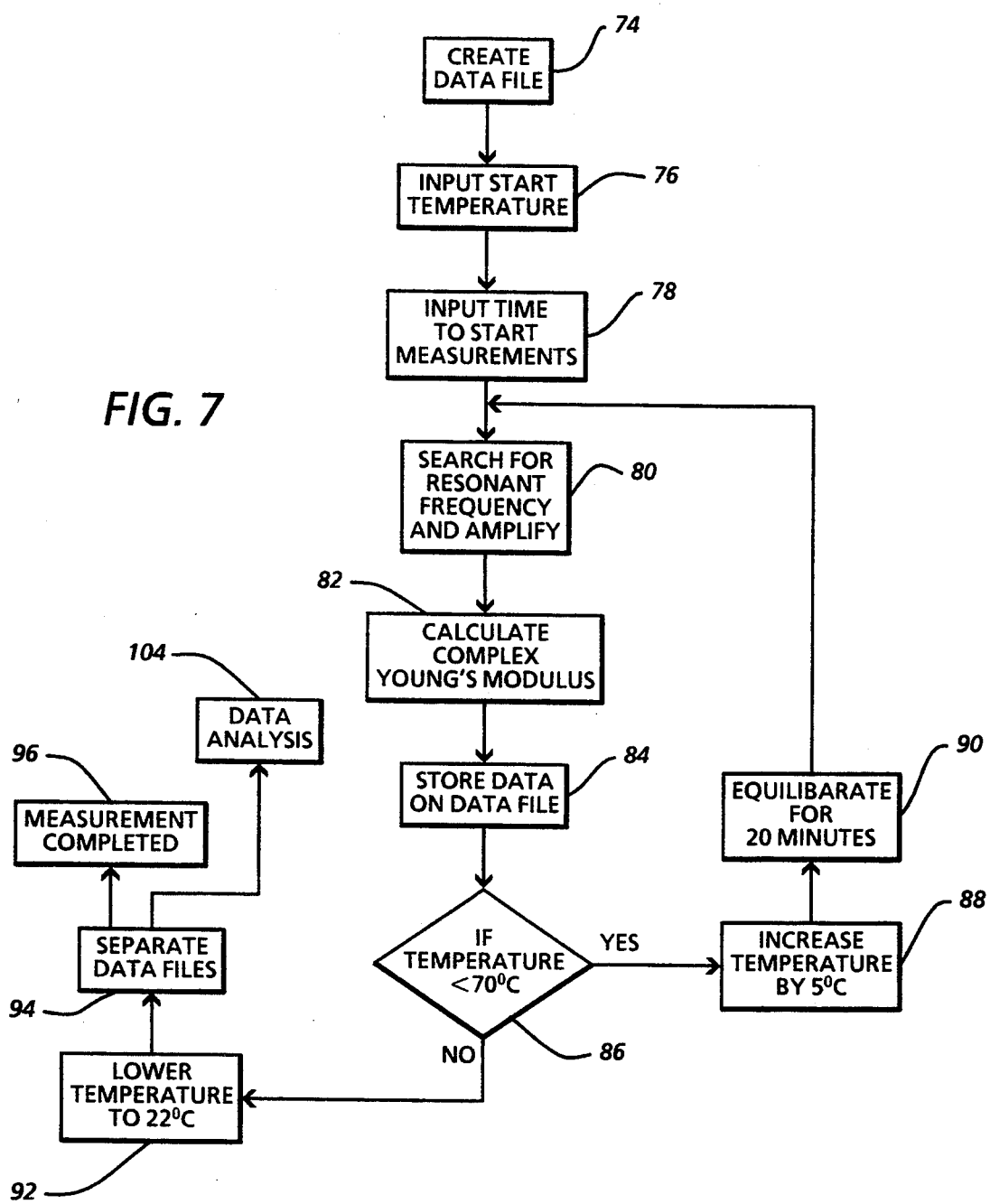
FIGS. 7–9 are flow chart diagrams of the computer programs automating data collection, analysis and material property calculations in accordance with the invention.
Figure 8:
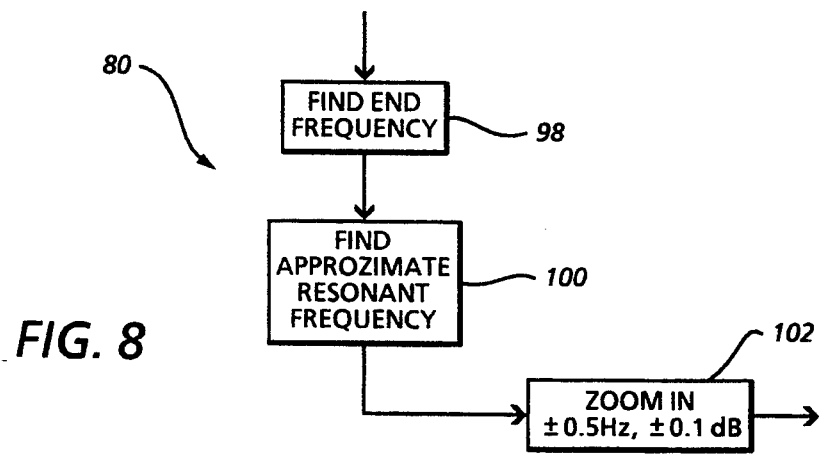

A critical aspect of the foregoing data collection program, diagrammed in FIG. 7, is the search for resonant peaks and frequency in the readout display of measurement data as denoted by block 80. FIG. 8 diagrams the steps involved in such programmed search, involving the finding of end frequency as denoted by block 98, finding the approximate resonant frequency as indicated by block 100 and zooming in more precisely on the resonant frequency, within ±0.5 Hz and amplitude ratio within ±0.1 dB for example, as denoted in diagram block 102 of FIG. 8. Such zoom-in step 102 involves (a) expansion of the frequency scale for the amplitude ratio data plotted by curve 62 in FIG. 3 between limits of a narrowed frequency range within which the resonant frequency ($f_1$) is centered; (b) location of a precise value for resonant frequency ($f_1$) at ±90° narrowed range of the phase difference scale for curve 72 in FIG. 4; and (c) location of the amplitude value at frequency ($f_1$) on the expanded range portion of the curve 62.

As also diagrammed in FIG. 7, the computer 24 is programmed to perform data analysis as denoted by block 104. The details of such data analysis program are shown in the program flow chart of FIG. 9. Initially, a search is performed for incorrect data points, such as those giving negative values of modulus or loss factor, as indicated by diagram block 106 in FIG. 9. Also, step 106 of the data analysis program deletes temperature measurement for which only a single data point was determined from the raw input data. The raw input data so processed to delete the bad data points by step 106, is then shifted by the time-temperature superposition principle aforementioned involving a series of steps as diagrammed in FIG. 9. Such processed data is then utilized to determine shift constants as indicated by diagram block 108, through which master curves of modulus and loss factor vs. reduced frequency are plotted as denoted in block 110 of FIG. 9.

Figure 9:
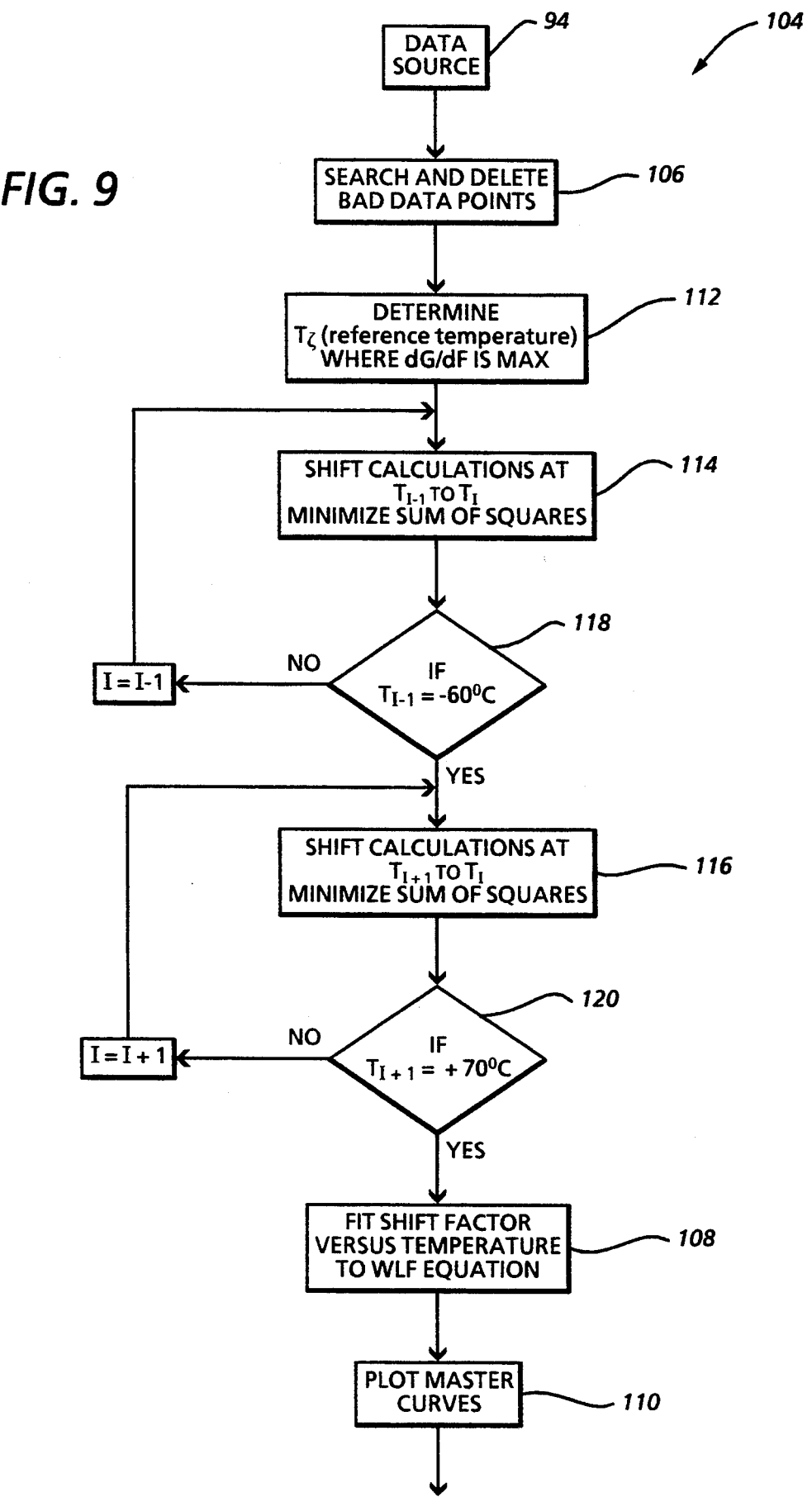

With continued reference to FIG. 9, the time-temperature superposition sequence is initiated by the step of determining a reference temperature $T_f$ as denoted in block 112, followed by the data shift steps 114 and 116 from which the data so shifted is utilized in the shift factor step 108 when the temperature condition set forth in decision blocks 118 and 120 are met.

Numerous other modifications and variations of the present invention are possible in light of the foregoing teachings. It is therefore to be understood that within the scope of the appended claims the invention may be practiced otherwise than as specifically described.

What is claimed is:

1. In a method of determining material properties by measuring vibration acceleration of a plurality of test specimens induced by random noise within a frequency range establishing standing waves propagated between driven ends of the specimens and opposite freely movable ends from which measurements are obtained on ratio of acceleration amplitude at said ends and acceleration phase difference between said ends at resonant frequencies of the standing waves and calculations performed with respect to said measurements, the steps of: acoustically driving the driven ends of said specimens simultaneously to obtain the measurements of the ratio of acceleration amplitude therefrom; selecting the calculations obtained simultaneously from the measurements of the plurality of the driven specimens at the resonant frequencies of the standing waves; programming said acoustic driving of the driven ends of the specimens to restrict the simultaneously obtained measurements and the selected calculations to limited time periods; and automatically analyzing the selected calculations to determine the material properties.

2. The method as defined in claim 1 wherein said step of selecting includes: collecting data limited to the measurements simultaneously obtained from the specimens, within a predetermined testing temperature range during said limited time periods, with respect to the ratio of acceleration amplitude and phase difference; searching the phase difference in collected data to precisely locate the resonant frequencies; and extracting the ratio of acceleration amplitude from the collected data corresponding only to the precisely located resonant frequencies.

3. The method as defined in claim 2 including the step of shifting the selected calculations in accordance with time-temperature superposition principle within said testing temperature range from which the material properties are calculated.

4. The method as defined in claim 1 including the step of shifting the selected calculations in accordance with time-temperature superposition principle.

5. The method as defined in claim 1 wherein said step of programming includes: monitoring temperature of the test specimens; heating the test specimens in response to said monitored temperature being less than a predetermined temperature; and delaying said driving of the specimens to obtain the measurements for a predetermined interval to allow uniform distribution of the temperature amongst the heated test specimens before said simultaneous measurements thereof is obtained.

6. The method as defined in claim 5 wherein said predetermined interval is 20 minutes between the measurements.

7. The method as defined in claim 6 wherein said predetermined temperature is 70° C.

8. The method as defined in claim 5 wherein said predetermined temperature is 70° C.

9. In apparatus for determining material properties within a temperature controlled enclosure by means of random noise, a plurality of accelerometers and analyzer means operatively connected to the accelerometers for analysis of acoustical vibrations induced by the random noise, the improvement residing in: means for separately mounting a plurality of test specimens with the accelerometers carried thereon in spaced relation within the enclosure, means for simultaneously inducing the acoustical vibrations in the test specimens by the random noise from the accelerators, data collection means operatively connecting the accelerometers to the analyzer means for transmission of measurements of the acoustical vibrations simultaneously induced in the specimens, by said random noise from the accelerometers, means programming said inducing of the acoustical vibrations for restricting said transmission of the measurements to limited periods of time, and programmed computer means operatively connected to the analyzer means and the data collection means for automatically calculating the material properties of the specimens from said measurements transmitted during said limited periods of time.

10. The improvement as defined in claim 9 wherein the programmed computer means includes means for selecting the material properties calculated from the measurements obtained within said limited periods of time at resonant frequencies of the acoustical vibrations.

11. The improvement as defined in claim 10 wherein said limited periods of time are determined by delay intervals between said transmission of the simultaneous measurements.

12. The improvement as defined in claim 11 wherein said delay intervals are 20 minutes.

* * * * *